United States Patent [19]
Sawin et al.

[11] 3,781,778
[45] Dec. 25, 1973

[54] MARINE STREAMER CABLE

[75] Inventors: Frederick C. Sawin; William A. Whitfill, Jr., both of Houston, Tex.

[73] Assignee: Schlumberger Technology Corporation, New York, N.Y.

[22] Filed: Apr. 19, 1972

[21] Appl. No.: 245,330

[52] U.S. Cl............................ 340/7 R, 174/101.5
[51] Int. Cl............................................. G01v 1/16
[58] Field of Search.................... 340/7 R; 174/101.5

[56] References Cited
UNITED STATES PATENTS
| | | | |
|---|---|---|---|
| 3,434,104 | 3/1969 | Stapleton et al. | 340/7 R |
| 3,699,237 | 10/1972 | Melia | 174/101.5 |
| 3,531,760 | 9/1970 | Whitfill, Jr. | 340/7 R |

*Primary Examiner*—Benjamin A. Borchelt
*Assistant Examiner*—H. A. Birmiel
*Attorney*—Ernest R. Archambeau, Jr. et al.

[57] ABSTRACT

In accordance with an illustrative embodiment of the present invention, a marine streamer cable of layered solid construction includes a cable core with a stress member and electrical conductors extending eccentrically within a tubular flotation body. Seismic transducer assemblies are provided at spaced points along the cable with each assembly including a rigid case construction that houses a disc-type hydrophone to the side of the core and within the circumferential outline of the flotation body.

12 Claims, 4 Drawing Figures

PATENTED DEC 25 1973  3,781,778
FIG. 1
FIG. 2
FIG. 3
FIG. 4
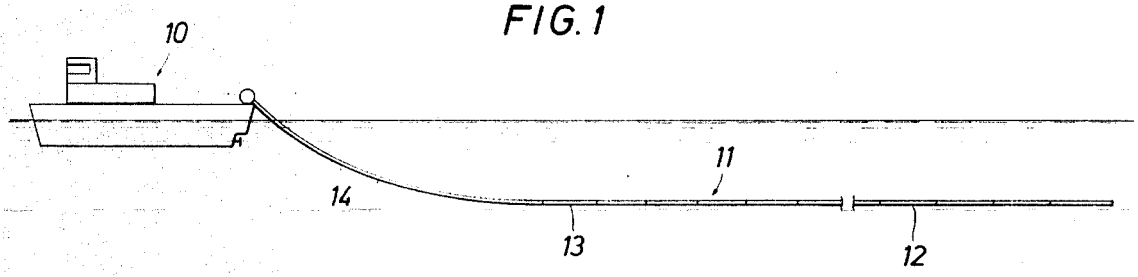
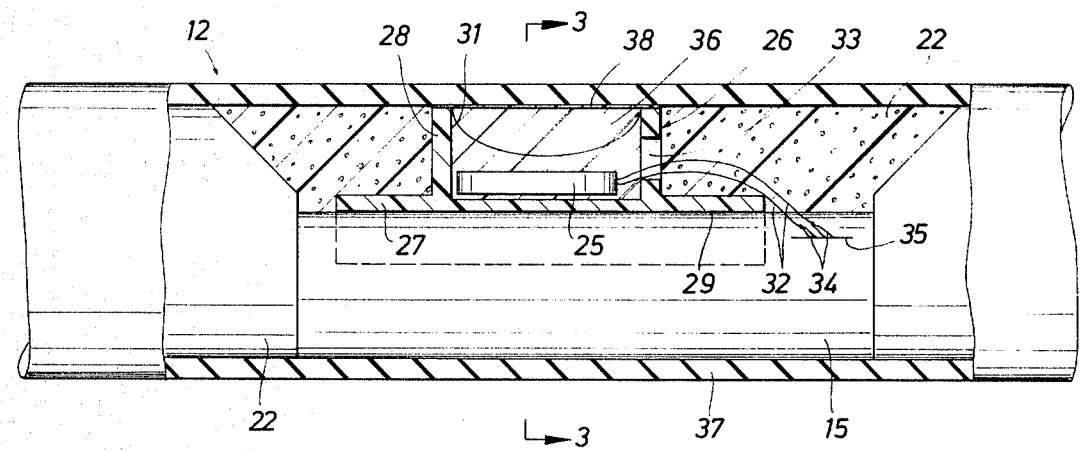
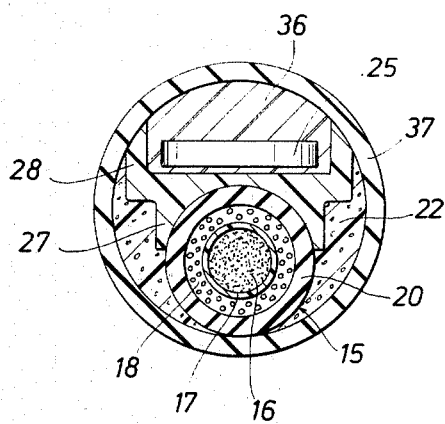
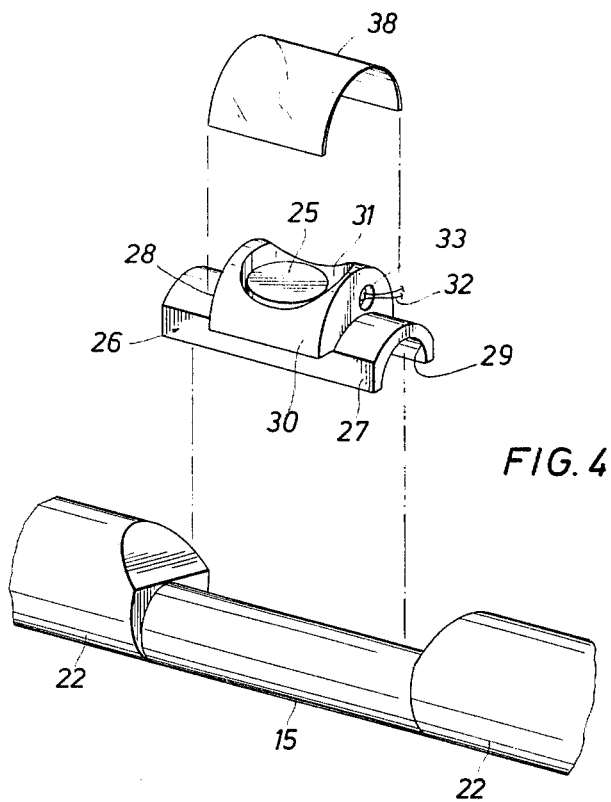

MARINE STREAMER CABLE

This invention relates generally to marine streamer cables, and more particularly to a new and improved streamer cable of layered solid construction that has seismic transducers provided at spaced points therealong.

A typical marine streamer cable is towed submerged in the water behind a boat and is provided with detectors such as hydrophones that are sensitive to reflected wave energy in order to map the profile of geological strata underlying the sea bottom. Acoustic wave energy is provided in the vicinity of the cable by various devices well known to those skilled in the art, and the wave energy travels downwardly through the earth. At levels where there is a contrast in velocity propagation characteristics of the earth stratum, a portion of the wave energy is reflected upwardly. The upwardly traveling seismic reflections produce acoustic pressure waves in the water and these waves cause the transducers in the streamer cable to respond, the transducers being electrically connected to suitable signal processing and recording equipment onboard the tow boat. In this manner it is possible to map the underlying geological strata.

While a number of different types of streamer cables have been commercially offered, perhaps the most prevalent type of streamer is made by providing an elongated flexible tubular conduit within which is disposed a signal wire bundle and a plurality of spaced apart hydrophone tranducers. To produce neutral buoyancy and thereby facilitate towing of the cable at a proper depth below the sea surface, the tubular conduit is generally filled with a liquid of low specific gravity, such as oil or kerosone, the overall specific gravity of the cable being nearly equal to that of sea water.

While oil or kerosene filled streamer cables have had widespread use, they have a number of significant shortcomings. For example, in order to maintain an appropriate streamer density, the flexible conduit must have a relatively thin wall in order to allow efficient transmission of seismic waves therethrough. Thin walled conduits are more subject to rupture, however, thereby allowing contamination of the oil or kerosene with a corrosive fluid such as sea water and resulting in disparagement of hydrophone accuracy, loss of sensitivity and corrosion damage. Such damage may in fact render a streamer cable in short order beyond repair. On the other hand, leakage of oil from the cable may cause it to sink. Another disadvantage for this type of streamer is its large size and weight which make the handling and the shipping thereof more difficult and expensive, particularly where long distance transport is necessary. Yet another disadvantage is that the hydrophone transducers themselves must be protected from damage by the oil or kerosene within the tubular conduit, resulting in elevated manufacturing costs. Moreover, the typical oil filled streamer is bulky and somewhat difficult to handle and spool for storage, and contains fragile crystal transducers that are subject to breakage during winding and reeling operations.

It is the principle object of this invention to provide a new and improved solid streamer cable that is constructed and arranged to overcome the above-mentioned problems.

This and other objects are attained in accordance with the concepts of the present invention through the provision of a streamer cable of layered solid construction having a cable core that includes a stress member and electrical conductors disposed within a cylindrical body of flotation material. In order to provide for installation of transducers at spaced points therealong, the cable core is disposed within the flotation body eccentrically with respect to the longitudinal axis of the body, and transducers are housed in rigid case constructions located to the side of the core at spaced points therealong and within the circumferential outline of the flotation body. In a preferred embodiment, each rigid case construction includes a first recessed portion and a second recessed portion, the first portion being arranged and adapted to receive an acoustic energy or seismic transducer, and the second portion is shaped and arranged to fit against an external surface of the cable core. The case construction is encapsulated to a diameter generally equal to that of the flotation body by a potting material having an impedance to the transmission of acoustic wave energy matched to that of sea water. The entire assembly provides for a relatively small diameter, flexible streamer cable that is easily manufactured and spooled for storage, and is free of the problems associated with the prior art oil filled devices.

The present invention has other objects and advantages that will become more fully apparent in connection with the following detailed description of an embodiment thereof, taken in conjunction with the appended drawings in which:

FIG. 1 is a somewhat schematic view of a seismic survey utilizing a marine streamer cable that is towed through the water behind a boat;

FIG. 2 is a sectional view, with portion in side elevation, of a streamer cable and hydrophone installation in accordance with this invention;

FIG. 3 is a cross-section taken on line 3—3 of FIG. 2; and

FIG. 4 is an isometric view of certain parts of the hydrophone installation and streamer cable.

Referring initially to FIG. 1, a seismic exploration boat 10 is shown towing a marine streamer cable 11 through the water. The cable can be quite lengthy, for example, about one mile long, and is normally composed of a number of individual sections 12 connected end-to-end. The forward section may be connected to a "dead" section 13 (that is to say no hydrophones) which is in turn connected to the boat 10 by a typical lead-in section 14. Each "live" section 12 contains a number of hydrophones as will be set forth in detail below, the hydrophones being positioned at spaced intervals along the section as desired and being coupled by electrical conductors extending along the cable to conventional signal processing and recording equipment on board the boat 10. As will be appreciated by those skilled in the art, acoustic wave energy is provided in the vicinity of the cable by a shot boat, or by vibration or pulse producing systems, or other conventional equipment. The hydrophones detect upcoming reflected wave energy, and the streamer cable is towed normally at a depth of about 40 ft. below the surface for best reception. Various depth control and monitoring systems (not shown) are used to maintain the cable 11 at proper depth.

As shown in FIGS. 2 and 3, the cable 12 has a substantially solid construction. The core 15 of the cable comprises a center stress member 16 that may be, for example, a wire rope. On the other hand, the stress member 16 can comprise a large number of low twist yarns that are paralleled in a bundle and held together by a jacket 17 as described in U.S. Pat. No. 3,710,006, Davis, assigned to the assignee of this invention. A plurality of pairs of electrical conductors 18 are cabled around the stress member 16 on a right lay angle, for example, with the voids between conductors filled with a suitable filler compound in a typical manner. The outer part of the core is constituted by a urethane jacket 20 that is extruded over the conductors 18 and the filler 19.

As is shown particularly well in FIG. 3, the core 15 is disposed within a cylindrical body 22 of flotation material and is eccentrically arranged with respect to the longitudinal axis of the body 22. The flotation body 22 may be made of a special cellular compound that can be foam extruded to appropriate dimension based on the desired buoyancy. For details of a cellular compound that is particularly suited to this application, reference may be had to U.S. Pat. Application Ser. No. 105,547, Davis, assigned to the Assignee of this invention. Alternatively, the flotation body 22 may be applied about the core 20 by an injection molding process using a pliable material that can be purchased from Emerson and Cuming, Inc. of Northbrook, Illinois under the trade name "US-35." This material is a urethane having embedded glass or plastic microspheres or balloons to give the desired specific gravity. In any event, the overall streamer cable is sized to have a composite specific gravity substantially equal to that of sea water so as to be neutrally buoyant therein.

Hydrophone assemblies 25 are provided along the streamer cable 12 at spaced points and are housed in case constructions in accordance with the principles of the present invention and indicated generally at 26. Each case construction 26 is preferably made of a rigid material such as hard plastic or steel, and comprises a saddle portion 27 and a transducer container portion 28. The saddle portion 27 is elongated as shown and has an internal circular recess 29 formed on substantially the same diameter as the cable core 15 so as to fit snugly thereagainst. The container portion 28 is somewhat cylindrical with a smoothly curved outer peripheral surface 30 (FIG. 4) formed on substantially the same diameter as the flotation body 22. The container portion 28 is provided with a circular recess 31 that is adapted to receive the hydrophone assembly 25, which can be, for example, an acceleration cancelling disc-type hydrophone that is sold under the designation Model 1121 by Marine Resources, Inc. of Fern Park, Florida. The leads 32 from the hydrophone are brought out through an opening 33 in the wall of the container portion 28 and are electrically connected in a suitable manner to a pair of the electrical conductors 34 taken out through a slit 35 or the like in the jacket 20 of the cable core 15. The hydrophone assembly 25 is encapsulated within the recess 31 by a material 36 to be described below, the material being selected to have an impedence to the passage of acoustical energy that is matched to that of sea water. Although several compounds are suitable, one that has been found to be particularly suitable is a dielectric gel potting material that can be purchased from the Dow-Corning Corp. of Midland, Michigan under the trade name "Sylgard-51." Finally, a urethane or other tough plastic jacket 37 is extruded as the outermost layer of the streamer cable to provide a relatively smooth and damage resistant outer surface.

To manufacture the streamer cable 12, the cable core 15 is made by cabling the conductors 18 about the stress member 16 and then applying by conventional extrusion processes the filler 19 and then the jacket 20. The flotation body 22 can be formed by an injection molding process using tubular mold forms, the core 15 being positioned eccentrically with respect to the longitudinal axis of the flotation body 22 as shown in FIG. 3. At spaced points along the core 15 where the hydrophones are to be stationed, a gap is provided as is shown in FIG. 4 in the flotation body 22 of a suitable length to enable convenient installation. On the other hand, where the flotation body 22 is formed by a continuous extrusion process, a sufficient material is later removed at stations where the hydrophones are to be installed.

An individual hydrophone case 26 constructed and arranged as shown and described is armed with a hydrophone 25 as follows. A few drops of the dielectric gel 36 are placed in the bottom of the recess 31 in order to completely cover this surface, whereupon the hydrophone assembly 25 is disposed within the recess with the leads 32 coming to the outside via the opening 33. Several small foam pads (not shown) may be positioned around the sides of the hydrophone. Next a thin sheet of plastic film 38 is positioned so as to cover the opening of the recess 31, and is suitably attached to the external surface 30. Now the case 26 is placed on its end with the lead opening 31 up, and a syringe or the like is used to completely fill the cavity 31 with the above described dielectric gel, whereupon the opening 31 may be sealed off with a suitable epoxy resin or the like.

To install the hydrophone equipped case constructions 26, the jacket 20 of the core 15 is slit at 35 and loops of a pair of electrical conductors 34 are pulled out and their insulation stripped away for a small distance to enable connection of the hydrophone leads 32 by soldering or the like. The saddle portion 27 is mounted against the side of the core 15 with the recessed portion 28 oriented properly so that the entire case is within the circumferential outline of the flotation body, and the case may be secured to the core by applying tape or the like around the extending end sections of the saddle portion and the core.

A suitable mold (not shown) is then positioned around the open section of the flotation body 22, and a suitable amount of the cellular compound is injected thereunto in order to form up the flotation body about the hydrophone installation. Finally the outer jacket 37 is extruded over the cable to provide a smooth and damage resistant outer surface.

Due to the off-center disposition of the cable core within the flotation body, the hydrophones can be mounted to the side thereof and still maintain an overall diameter for the composite cable which is relatively small, for example, about 1½ inch. Accordingly, the streamer cable is quite flexible to allow convenient spooling for storage. The solid construction of the cable obviates the numerous disadvantages in the prior art oil-filled devices. Moreover, the housing of the hydrophone assemblies within rigid case constructions substantially isolates them with respect to ambient shear stresses and gives improved noise rejection in actual operations, and provides protection against accidental damage during reeling operations.

Since certain changes or modifications may be made in the disclosed embodiment without departing from the inventive concepts involved, it is the aim of the appended claims to cover all such changes or modifications falling within the true spirit and scope of the present invention.

We claim:

1. A marine streamer cable comprising: a flotation body having a longitudinal axis; a cable core including a stress member with electrical conductors therealong, said cable core being disposed within said flotation body eccentrically with respect to said longitudinal axis; and rigid case means for housing an acoustic energy transducer within said flotation body to the side of said cable core, said case means including a housing portion provided with a recess opening to the exterior thereof arranged to receive said acoustic energy transducer.

2. The marine streamer cable of claim 1 wherein said case means further includes a saddle portion underneath said housing portion, said saddle portion being arranged to fit against said cable core.

3. The marine streamer cable of claim 2 wherein said housing portion has a curved outer periphery formed on substantially the same diameter as the diameter of said flotation body, said saddle portion having a curved inner periphery formed on substantially the same diameter as the diameter of said cable core.

4. The marine streamer cable of claim 3 wherein said housing portion is provided with an aperture opening into said recess and arranged for taking out the leads of an acoustic energy transducer to enable their connection to said electrical conductors.

5. A marine streamer cable comprising: a flotation body having a longitudinal axis; a cable core including a stress member with electrical conductors therealong, said cable core being disposed within said flotation body eccentrically with respect to said longitudinal axis; and rigid case means for housing an acoustic energy transducer to the side of said cable core and within the circumferential outline of said flotation body, said case means including a first recessed portion and a second recessed portion, said first recessed portion being adapted for receiving said transducer, said second recessed portion being shaped and arranged to fit against an external surface of said cable core.

6. The marine cable of claim 5 wherein said first recessed portion has a curved outer peripheral surface formed on substantially the same diameter as said flotation body.

7. The marine streamer cable of claim 6 wherein said second recessed portion has a curved inner peripheral surface formed on substantially the same diameter as said cable core.

8. The marine streamer cable of claim 7 wherein said inner peripheral surface is formed in part within end sections of said second recessed portion, said end sections extending along said cable core to either side of said first recessed portion.

9. The marine streamer cable of claim 5 further including means in said first recessed portion for encapsulating said transducer, said encapsulating means having an impedance to the transmission of acoustic wave energy substantially matched to that of sea water.

10. The marine streamer cable of claim 9 further including an outer protective sheath around said flotation body.

11. The marine streamer cable of claim 9 further including a relatively thin-walled, flexible sheath applied to said outer peripheral surface of said first recessed portion to enclose said encapsulating means and said transducer.

12. The marine streamer cable of claim 9 wherein said encapsulating means is a dielectric gel potting material.

* * * * *